United States Patent [19]

Scibor-Rylski

[11] 4,196,977

[45] Apr. 8, 1980

[54] ELECTRO-OPTIC MODULATOR/DEFLECTOR

[75] Inventor: Marek T. Scibor-Rylski, Hartley Wintney, England

[73] Assignee: Xerox Corporation, Stamford, Conn.

[21] Appl. No.: 802,224

[22] Filed: Jun. 1, 1977

[30] Foreign Application Priority Data

Jul. 9, 1976 [GB] United Kingdom ............... 28568/76

[51] Int. Cl.² ............................................. G02F 1/03
[52] U.S. Cl. ..................................................... 350/356
[58] Field of Search ............ 350/356, 355, 353, 96.13, 350/96.14

[56] References Cited

U.S. PATENT DOCUMENTS 3,958,862   5/1976   Scibor-Rylski ...................... 350/356

FOREIGN PATENT DOCUMENTS 1179640 10/1964 Fed. Rep. of Germany ........... 350/356

OTHER PUBLICATIONS

Ramachandran et al., "Noise Generated in the Total Internal Reflection Electro-optic Diffraction Deflector/Modulator," J. Phys. D: Appl. Phys., vol. 7, 1974, pp. 2479–2483.

Ramachandran et al., "A Novel Electro-optic Diffraction Deflector," J. Phys. D: Appl. Phys., vol. 8, No. 9, Jun. 21, 1975, pp. 2115–2117.

*Primary Examiner*—James W. Davie
*Attorney, Agent, or Firm*—Irving Keschner

[57] ABSTRACT

An electro-optical modulator/deflector including electro-optical material and an electrode pattern arranged in response to a voltage supply to provide an electric field in the material to influence the deflection of a light beam at the moment of total internal reflection, and at least one further electrode arranged such that on application of a high voltage between said further electrode or electrodes and said electrode pattern there is in use generated within said electro-optical material in the region of said electrode pattern a phase change in the wavefront of the light beam in a sense opposite to the phase change caused by an inherent diffraction grating effect of the electrode pattern.

7 Claims, 3 Drawing Figures

4,196,977

ELECTRO-OPTIC MODULATOR/DEFLECTOR

BACKGROUND OF THE INVENTION

1. Field of the Invention

The invention relates to electro-optical modulator/deflectors.

2. Description of the Prior Art

Particular types of electro-optical modulators have been recently developed such as, for example, described in Electronic Letters 9, 1973, pages 309 and 310, and in Proceedings of IEE, Volume 199, No. 7, 1972, pages 807 to 814. The operation of these modulators depends on the effect of applying a voltage to a symmetrical electrode pattern to induce periodic change of the refractive index in an electro-optic element in the region of the surface of the element at the moment of total internal reflection. The resulting symmetrical periodic phase change induced in the wave-front of a light beam directed through or at the electro-optical element produces a far field pattern of the Raman-nath form exhibiting symmetry about the zero energy order. The zero order of the output beam can best be modulated by adjusting the applied voltage to the electrode pattern to alter the distribution of the light from the zero order into higher orders, and as often desired, to eliminate the zero order.

It has been noted that at zero applied voltage a residual-diffraction pattern appears in the far field. It has already been disclosed that this pattern is due to reflection of the light off the interdigital electrode pattern on the surface of the electro-optical element. That is, the electrode pattern produces an inherent diffraction grating effect in its own right before the application of the voltage to the electrodes. The presence of the residual-diffraction pattern appears as 'noise' in practical configurations of electro-optical modulators.

SUMMARY OF THE INVENTION

According to the invention, there is provided an electro-optical modulator/deflector including electro-optical material and an electrode pattern arranged in response to a voltage supply to provide an electric field in the material to influence the deflection of a light beam at the moment of total internal reflection, and at least one further electrode arranged such that on application of a high voltage between said further electrode or electrodes and said electrode pattern there is in use generated within said electro-optical material in the region of said electrode pattern a phase change in the wavefront of the light beam in a sense opposite to the phase change caused by an inherent diffraction grating effect of the electrode pattern.

BRIEF DESCRIPTION OF THE DRAWINGS

Electro-optical modulator/deflectors according to the invention will now be described by way of example with reference to the accompanying drawings in which.

DESCRIPTION OF THE PREFERRED EMBODIMENT

Figure 1:
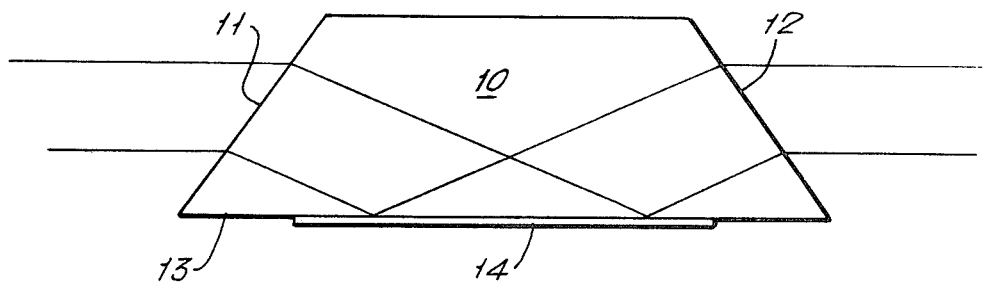
FIG. 1 shows schematically and illustratively a prior art type of modulator/deflector configuration.

Referring to FIG. 1, the modulator consists of electro-optic material formed of a $LiNbO_3$ xy cut crystal 10. The crystal 10 has three polished surfaces 11, 12 and 13. The angles of surfaces 11 and 12 are arranged such that a collimated beam of light parallel to the plane of the surface 13 is deflected at the surfaces 11 and 12 to suffer total internal reflection at the surface 13. It will be appreciated that other than shown crystal shapes are possible to achieve the total internal reflection. However, in the form shown, a crystal with overall dimensions of about $4 \times 4 \times 15$ mm provides satisfactory operation.

Figure 2:
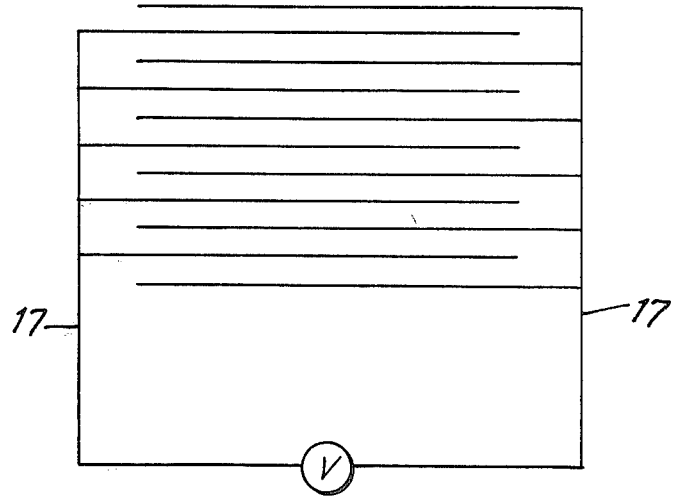
FIG. 2 shows a conventional interdigital electrode pattern for use with modulators/deflectors.

An electrode pattern 14 is deposited on the surface 13 in an array as shown in FIG. 2 with the operative electrodes parallel to the incident light beam. A voltage from voltage source 16 is applied in use to the electrode pattern via leads 17 and induces an electric field adjacent the surface 13 which alters the refractive index of the crystal. With the pattern shown, the modulator behaves in a similar manner to a phase diffraction grating to alter the light output beam.

The output beam is diffracted into a series of orders whose intensities vary with electrode voltage. For example, if a typical full modulation voltage of 70 volts is applied to the electrodes, the output light beam contains no zero order energy, the energy being transferred to other orders of energy. Thus, if these orders are stopped by suitable obstacles, the incident or original beam direction can be seen to be modulated by the application of the voltage.

Figure 3:
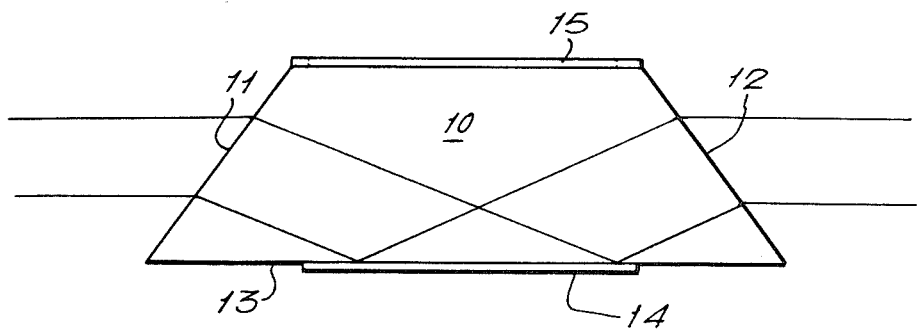
FIG. 3 shows schematically and illustratively a novel modulator/deflector configuration.

In FIG. 3, a further electrode 15 is provided comprising a single layer of copper which is vacuum deposited onto the upper surface of the modulator 10. In use, a high d.c. voltage source (not shown) of around 2000 volts is connected between the electrode 15 and the electrode pattern 14. On application of the high d.c. voltage electrical fields are generated between each electrode of the electrode pattern 14 and the electrode 15. This provides a field pattern which acts like a diffraction grating and produces a phase change in the wavefront to the light beam. The amount of the phase change can be adjusted by altering the magnitude of the applied high d.c. voltage. In practice, when no low voltage is applied independently to the electrode pattern, the high d.c. voltage is adjusted until the residual-diffraction pattern in the far field disappears or is at least substantially reduced. The explanation for the removal of the residual-diffraction pattern is that the phase change caused by the high voltage generated field pattern is opposite in sense and compensates for the phase change produced due to the difference of reflection from a dielectric/metal interface and a dielectric/air interface. That is, within the region of the electrode pattern the wave front is reflected at interfaces which are either lithium niobate and copper, where an electrode of the electrode pattern is present, or lithium niobate and air where an electrode is not present. Thus, the phase change resulting from the application of the high d.c. voltage acts in an opposite sense to compensate for the phase change caused by the inherent diffraction grating effect of the electrode pattern.

The precise magnitude of the d.c. voltage required depends essentially on the pitch of the electrodes in the electrode pattern, the angle at the moment of reflection, and the thickness and choice of the electro-optical material. In the configuration used, around 2000 volts is required to remove at least virtually completely the residual-diffraction pattern.

In use, a low d.c. voltage is applied to the electrode pattern, as has been explained. The field generated between the electrode 15 and individual electrodes of the electrode pattern then varies to some extent due to the low d.c. voltage and produces a somewhat uneven field pattern. However, the degree of unevenness is usually very small and the residual-diffraction pattern is suppressed for all practical purposes even when the low d.c. voltage is applied.

In the example described, the electrodes of the electrode pattern are 12 μm wide and 3.5 mm long, and the pitch between the electrodes is 50 μm. The electrode 15 is described as a single electrode but it will be appreciated that the single electrode 15 could be replaced by a number of separate further electrodes.

The modulator/deflector described is at least substantially insensitive to temperature variation because a phase-modulated technique is used which is virtually independent of temperature if temperature-independent electro-optic coefficients are used, for example, $r_{22}$ in $LiNbO_3$. Suitable electro-optic materials besides $LiNbO_3$ include $LiTaO_3$, BSN, ADP, KDP, $KD^xP$, KDA and $Ba_2NaNb_5O_{15}$.

What is claimed is:

1. An electro-optical laser beam modulator comprising:
    an electro-optical material having first, second, third and fourth surfaces arranged such that a laser beam parallel to said first surface is deflected at said second and third surfaces to suffer total internal reflection at said first surface, said fourth surface being opposite said first surface;
    an electrode pattern deposited on said first surface with operative electrodes parallel to said laser beam; and
    at least a second electrode provided on said fourth surface of said electro-optical material such that upon application of a voltage between said second electrode and said electrode pattern there is generated within said electro-optical material in the region of said electrode pattern a phase change in the wavefront of said laser beam in a sense opposite to the phase change caused by an inherent diffraction grating effect of said electrode pattern.

2. The modulator of claim 1 wherein said second electrode comprises a single layer of metal.

3. The modulator of claim 2 wherein said electrode pattern is an interdigitated pattern.

4. The modulator of claim 1 further comprising a direct current voltage source connected between said electrode pattern and said second electrode for generating electric fields between each electrode of said electrode pattern and said second electrode.

5. The modulator as defined in claim 2 wherein said metal layer is vacuum deposited.

6. The modulator as defined in claim 5 wherein said metal layer comprises copper.

7. The modulator as defined in claim 1 further comprising means for applying a voltage between said second electrode and said electrode pattern, the magnitude of said applied voltage being around 2000 volts.

* * * * *